United States Patent [19]

Chuang et al.

[11] Patent Number: 5,366,666
[45] Date of Patent: Nov. 22, 1994

[54] MULTIPLE DOWNCOMER FRACTIONATION TRAY HAVING PACKING BETWEEN DOWNCOMERS

[75] Inventors: Karl T. Chuang, Edmonton, Canada; Chong-Si Xu, Hangzhou, China; Guangxia Chen, Edmonton, Canada

[73] Assignee: UOP, Des Plaines, Ill.

[21] Appl. No.: 136,073

[22] Filed: Oct. 13, 1993

Related U.S. Application Data

[63] Continuation-in-part of Ser. No. 941,609, Sep. 8, 1992, Pat. No. 5,262,094, which is a continuation-in-part of Ser. No. 528,199, May 25, 1990, abandoned.

[51] Int. Cl.⁵ .............................................. B01F 3/04
[52] U.S. Cl. ................................... 261/97; 261/114.1
[58] Field of Search ................. 261/97, 94, 98, 114.1

[56] References Cited

U.S. PATENT DOCUMENTS

| | | | |
|---|---|---|---|
| 2,676,670 | 4/1954 | Gagnaire | 183/120 |
| 3,263,976 | 8/1966 | Hilinski | 261/DIG. 72 |
| 3,360,246 | 12/1967 | Eckert | 261/98 |
| 3,410,540 | 11/1968 | Bruckert | 261/113 |
| 3,491,792 | 1/1970 | Eckert | 261/97 |
| 3,685,971 | 8/1972 | Carson | 261/98 |
| 3,887,665 | 6/1975 | Mix et al. | 261/114 R |
| 3,996,317 | 12/1976 | Sarmiento et al. | 261/97 |
| 4,159,291 | 6/1979 | Bruckert | 261/97 |
| 4,185,075 | 1/1980 | Ellis et al. | 261/112.1 |
| 4,310,475 | 1/1982 | Leva | 261/94 |
| 4,808,350 | 2/1989 | Robbins et al. | 261/96 |
| 4,842,778 | 6/1989 | Chen et al. | 261/97 |
| 5,244,604 | 9/1993 | Miller et al. | 261/97 |
| 5,262,094 | 11/1993 | Chuang et al. | 261/98 |

FOREIGN PATENT DOCUMENTS

| | | | |
|---|---|---|---|
| 55-43343 | 3/1980 | Japan | 261/97 |
| 233878 | 5/1925 | United Kingdom . | |

Primary Examiner—Tim Miles
Attorney, Agent, or Firm—Thomas K. McBride; John F. Spears, Jr.

[57] ABSTRACT

The invention improves the performance of Multiple Downcomer fractionation trays and comprises placing a bed-like layer of packing material closely adjacent the bottom surface of the tray. The packing is located in the so-called "disengagement" zone under the tray and does not extend down to the tray below. Means comprising perforations in the downcomer sidewalls are provided to spread liquid from the tray above onto the packing material.

11 Claims, 3 Drawing Sheets

MULTIPLE DOWNCOMER FRACTIONATION TRAY HAVING PACKING BETWEEN DOWNCOMERS

CROSS REFERENCE TO RELATED APPLICATION

This application is a continuation-in-part of our application Ser. No. 07/941,609 filed Sep. 8, 1992, now U.S. Pat. No. 5,262,094, which was a continuation-in-part of our prior application Ser. No. 07/528,199 filed May 25, 1990, now abandoned. The entire teaching of our prior applications is expressly incorporated herein.

1. Field of the Invention

This invention relates to gas-liquid contacting apparatus used primarily as fractionation trays for the separation of volatile chemical compounds in a fractional distillation column.

There are two basic types of gas-liquid contacting apparatus used in distillation and adsorption. These are: (i) sieve or perforated trays which offer low efficiency and low cost, and (ii) random or ordered packed beds which are more efficient but which are also more expensive.

Sieve trays and packings are used extensively in gas-liquid contact applications such as distillation. In general, sieve trays are considered less efficient than the use of packings. This is in part due to the fact that there is a large space above the froth on the sieve tray that is not active for mass transfer. Assuming a typical froth height of 150 mm and a tray efficiency of 60%, then the height equivalent to a theoretical plate (HETP) would be 250 mm, a value close to that for the high performance structured packing. However, the vapor-liquid disengagement space above the froth is necessary for maintaining hydraulic stability of the tower. This space is about 2-3 times the froth height and as a result the HETP for a sieve tray is about 700 mm. This HETP is similar to that for a low efficiency random packing but considerably higher than that for a structured or ordered packing.

2. Prior Art

U.S. Pat. No. 3,410,540 issued to W. Bruckert is believed pertinent for its showing of the structure of a prior art Multiple Downcomer tray employing a highly distinctive downcomer design similar to that which may be employed in the subject invention.

British Patent Specification 233,878 to C. H. Borrmann illustrates a contacting column having alternating layers of packing and perforated plates or floors. The floors have small perforations to allow the descent of liquid and larger nozzle-shaped openings through which the vapor passes.

U.S. Pat. No. 2,676,670 issued to L. Gagnaire illustrates an apparatus for purifying gases by removing condensate and solid particles. The apparatus includes a bubble plate 10 and a packed bed 12 above the tray. The packed bed is employed to help remove particles from the gas of the feed stream. At each tray level cleaning liquid is withdrawn via line 16 and returned to the top of the column via lines 19 and 20.

U.S. Pat. No. 3,887,665 issued to T. W. Mix et al. illustrates the use of vapor-liquid disengagement and separation means 30 (col. 2, lines 30-42, col. 3, lines 44-50). These are deentrainment devices not intended as packing used for vapor liquid contacting. The deentrainment devices are not shown as being located directly under the trays.

U.S. Pat. No. 4,842,778 issued to G. Chen et al. illustrates a number of structural variations in packed vapor-liquid distillation columns and teaches the importance of initial vapor and liquid distribution and maintenance of this distribution throughout the bed in order to maximize efficiency. This reference illustrates the use of both random and structured packing 14 having multi-layer flow distribution sections for distributing liquid across the packing.

U.S. Pat. No. 4,808,350 issued to L. A. Robbins et al. is representative of the multitude of devices which have been developed to provide uniform distribution of liquid across packed contacting columns. It is a characteristic of these devices that they collect the liquid and then redistribute it without providing vapor-liquid contacting as is performed on a fractionation tray.

BRIEF SUMMARY OF THE INVENTION

There is a need for a gas-liquid contacting apparatus which makes use of sieve or frothing trays and yet has high mass transfer rates and high gas-liquid throughput.

According to the present invention there is provided a gas-liquid contacting apparatus, comprising: (a) an upwardly extending casing forming a flow path for the flow of liquid downwardly therethrough and flow of gas upwardly therethrough; (b) a series of frothing trays extending across and partitioning the flow path in the casing at different levels, each tray being perforated for upward vapor flow and supporting liquid which has been frothed by upwardly flowing gas therethrough with a plurality of parallel rectangular trough-like downcomers extending through the trays; (c) for each pair of frothing trays, a perforated packing tray partitioning the portion of the flow path of the casing therebetween to provide a packing section immediately beneath the upper frothing tray, and a flow path frothing section immediately above the lower frothing tray; and (d) gas-liquid distributing packings in the packing section.

Another embodiment may be characterized as a gas-liquid contacting apparatus comprising: (a) a cylindrical outer vessel; (b) a plurality of vertically spaced apart multiple downcomer fractionation trays located within said outer vessel, with each downcomer comprising two parallel planar (flat) sidewalls which extend through the tray and a liquid sealable outlet located above the deck of the next lower tray; (c) a plurality of beds of packing material with each bed of said plurality being (i) placed between a pair of two of said vertically spaced trays (ii) located closer to an upper tray than to a lower of said pair of trays; (iii) being equal in volume to less than one-half of the available volume in the outer vessel between said pair of trays; and (iv) at least partially filling the volumes located between the parallel downcomers; and, (d) means to distribute liquid collected on said upper tray into said bed of packing material through the side walls of said downcomers.

In some embodiments of the present invention, fluid permeable, gas distributing means are provided for each frothing tray, each fluid permeable, gas distributing means being adjacent the top side of the tray associated therewith for, in operation, breaking up any bubbles forming on the pores of that frothing tray.

DETAILED DESCRIPTION AND PREFERRED EMBODIMENTS

The accompanying drawings illustrate by way of example some embodiments of the present invention.

Figure 1:
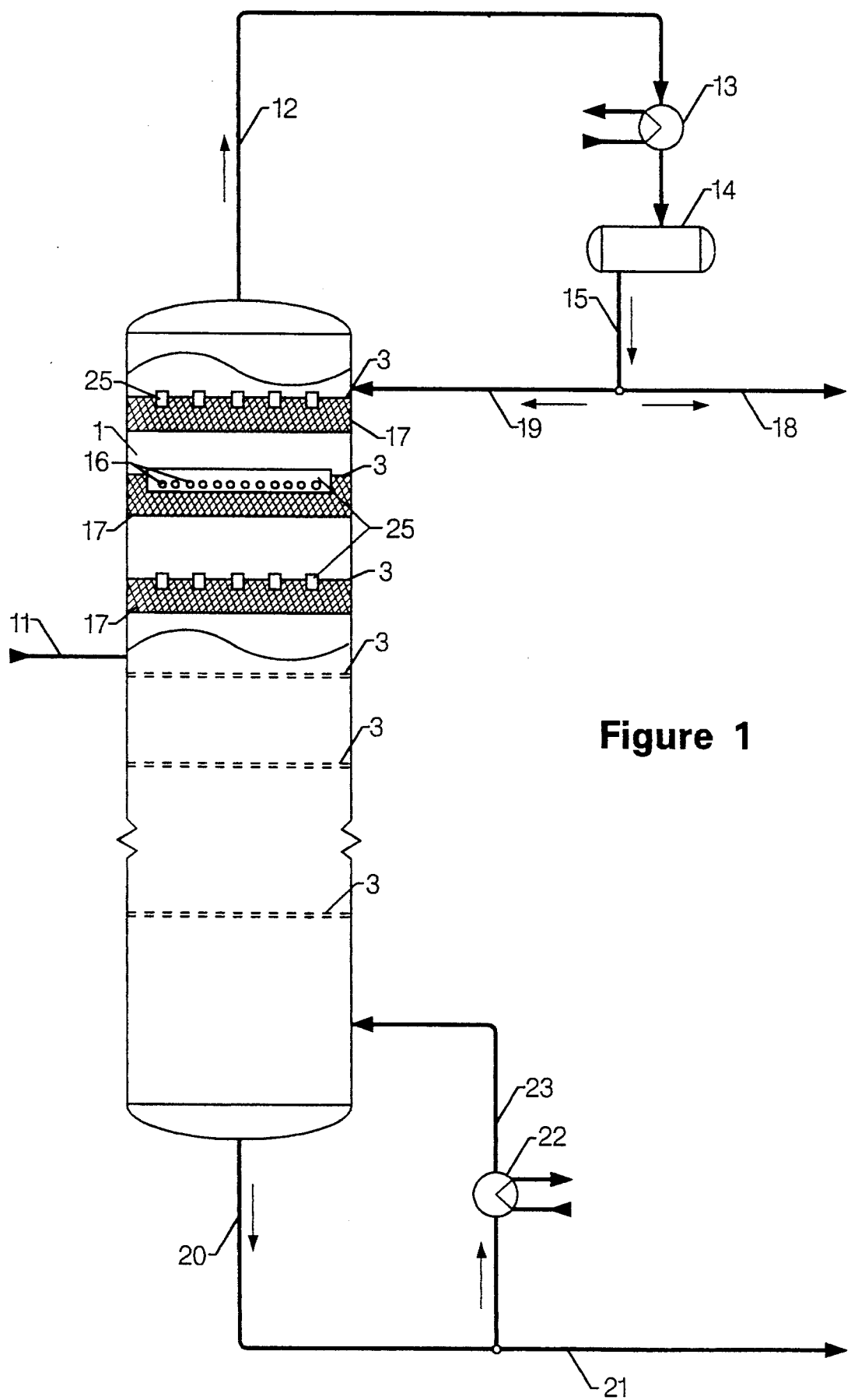
FIG. 1 is a diagrammatic, sectional side view of the subject gas-liquid contacting apparatus employed as a fractionation column.

Referring now to FIG. 1 there is shown a gas-liquid contacting apparatus comprising a cylindrical outer vessel, generally designated 1, employed as a fractionation column. A feed stream containing a mixture of chemical compounds having different relative volatilities enters the column via line 11 and falls onto a fractionation tray 3. The column contains a plurality, e.g., 15–45 of these fractionation or frothing trays located at uniform vertical intervals within the interval volume of the outer vessel. In the embodiment of our invention shown in the drawing each tray comprises five trough-shaped downcomers 25 spaced across the tray with sections of planar tray deck 2 being adjacent each downcomer sidewall 4. Vapor rises upward through perforations in the deck sections of the tray. Liquid descends through the column and is collected at each tray in the downcomers 25, with a portion of the liquid jetting out of perforations 16 in the downcomer sidewall 4 and entering vapor-liquid contacting material 17 referred to herein as packing.

Vapor containing the most volatile feed components emerges from the top of the column via line 12 and is passed through the overhead condenser 13. Condensation of the overhead vapor forms overhead liquid collected in the receiver 14. The liquid is removed via transfer line 15 and divided into the net overhead stream of line 18 and the reflux stream of line 19. Liquid comprising the least volatile compounds in the feed leaves the bottom of the column 1 via transfer line 20. A first portion is removed as the net bottoms stream of line 21, with a second portion passing through line 23 and reboiler 22 to generate reboiler fluid returned to the bottom of the column.

Figure 2:
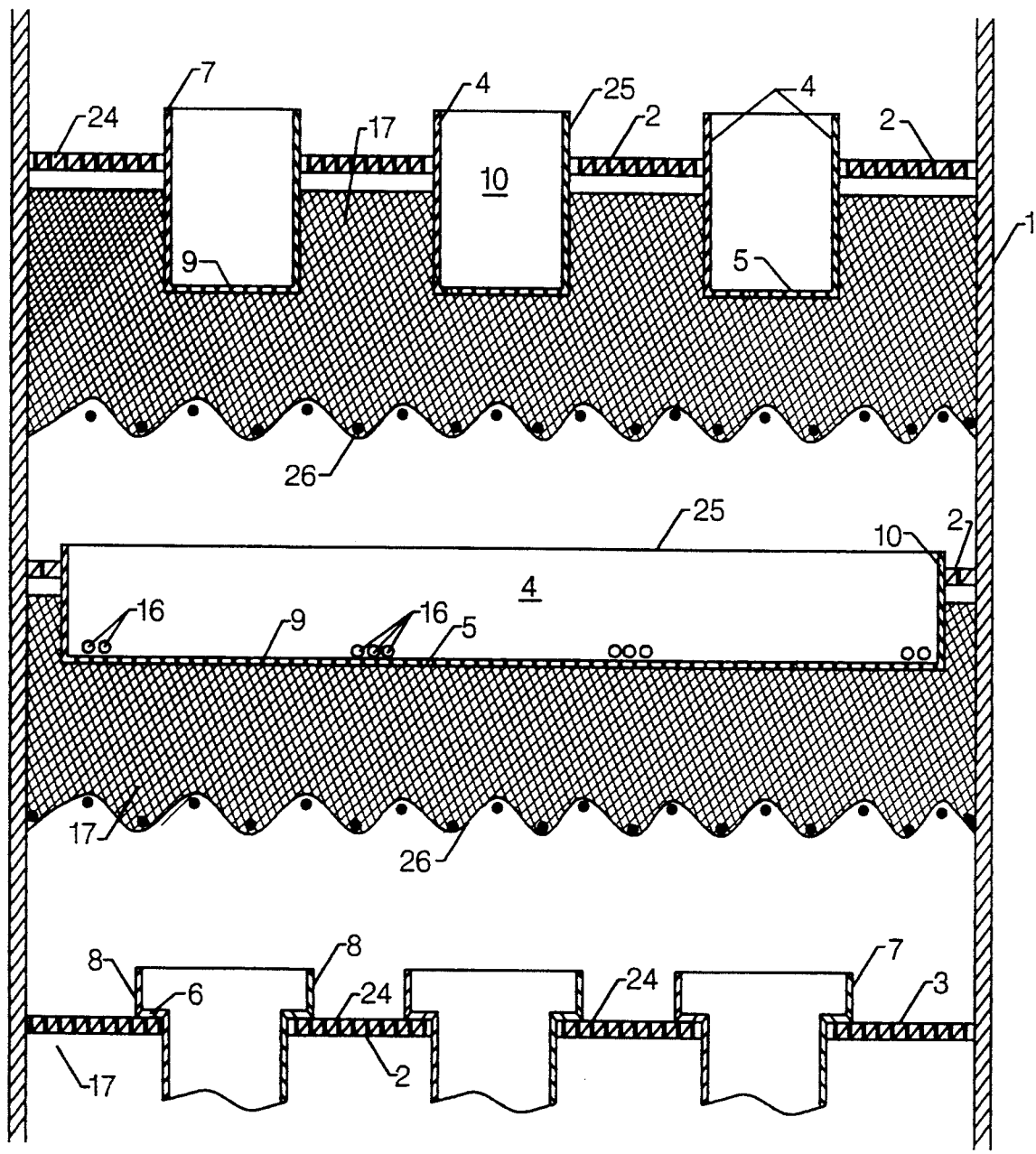
FIG. 2 is an enlarged diagrammatic, sectional side view of a portion of the gas-liquid contacting apparatus shown in FIG. 1.
Figure 3:
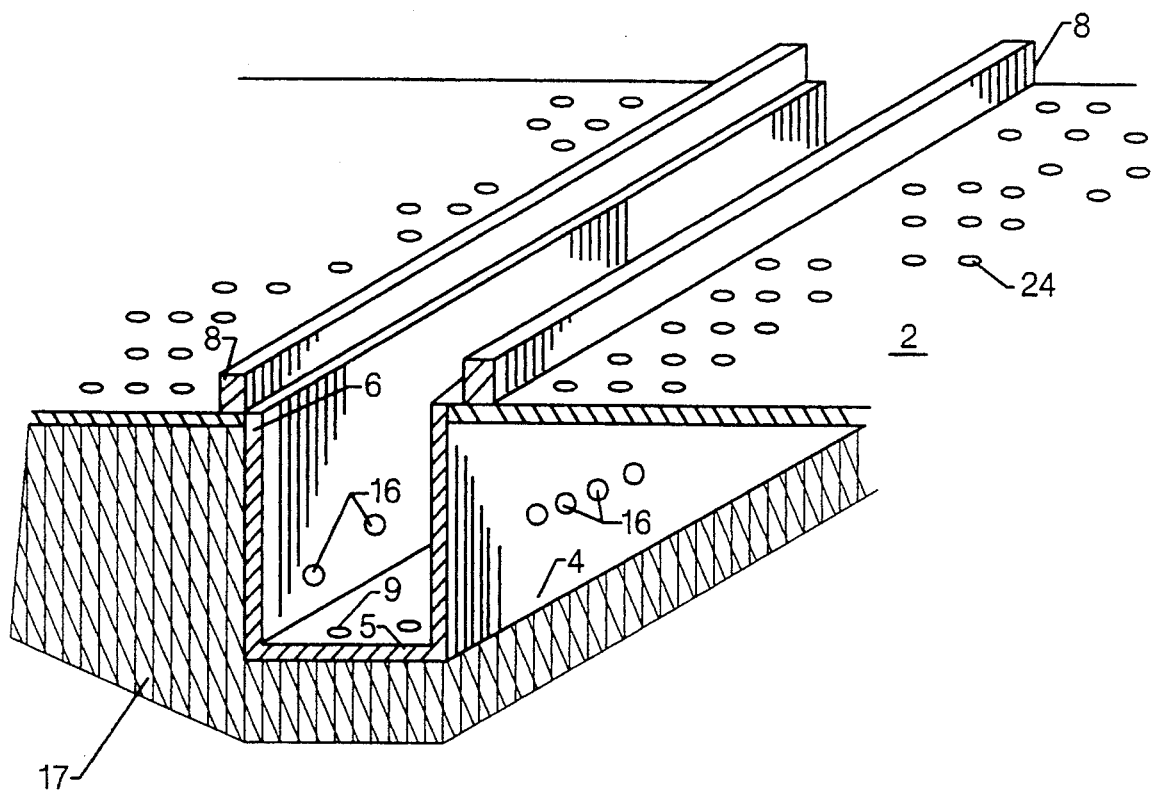
FIG. 3 is a diagrammatic, sectional isometric view showing details of a Multiple Downcomer tray employing the subject invention.

Each frothing tray may be in the form of a Multiple Downcomer tray as sold by UOP of Des Plaines, Ill. Referring now to FIGS. 2 and 3, there is shown the details of Multiple Downcomer trays modified for use in the subject invention. Each tray comprises a plurality of spaced deck portions spanning the width of the interior of the casing, with the deck portions of one frothing tray traversing the deck portions of vertically adjacent trays, with each space between two deck portions of a frothing tray having a downcomer provided and leading therefrom, each downcomer having perforated side walls and a fluid sealable lower wall, with each packing tray further comprising a plurality of perforated packing tray portions each enclosing a packing section beneath a frothing tray deck portion which is bounded by at least one downcomer perforated side wall such that the gas-liquid distributing packings are in each packing section beneath each frothing tray portion. That is, the frothing tray may be a conventional Multiple Downcomer tray modified by the provision of perforations in the downcomer sidewalls and the addition of packing between and below the downcomers as desired. The perforations are employed as a means to spread liquid on the narrow packing beds.

Before proceeding further with a description of FIGS. 2 and 3, it is useful to define and characterize the type of tray referred to herein as a "Multiple Downcomer" tray. This term is used herein to distinguish the subject invention from other types of fractionation trays.

A Multiple Downcomer tray is distinguished from the conventional crossflow tray by several structural characteristics. First, a multiple downcomer tray does not have a "receiving pan". This is the normally imperforate section located below an inlet downcomer opening. Reference is made to U.S. Pat. No. 4,582,569 to A. E. O. Jenkins which illustrates a receiving pan 8 in FIG. 1. A receiving pan is the imperforate area of a tray upon which the liquid descending through the downcomer impacts before passing horizontally onto the decking of the tray. Often the receiving pan is separated from the decking or "active" area of the tray by an inlet weir. Receiving pans are therefore normally located directly below the downcomer leading from the next above conventional fractionation tray.

The horizontal surface area of a Multiple Downcomer fractionation tray is basically divided into downcomer means and vapor-liquid contacting area normally referred to as decking. There are no imperforate areas allocated to receiving descending liquid from the tray located immediately above.

Another distinguishing feature of Multiple Downcomer fractionation trays is the provision of a relatively large number of trough-like downcomer means across the tray. The subject trays can employ from one to seven or more downcomers. These downcomer means are spaced relatively close together compared to the customary crossflow fractionation trays as they are spread across the surface of the tray rather than being at the periphery of the tray. The distance between adjacent downcomers (measured between their sidewalls or weirs) of the same tray is normally between 0.3 and 1.0 meters and will often be less than 0.5 meter. This results in a multiple downcomer type tray having a unique design consisting of the alternating decking areas and downcomer means evenly spaced across the upper surface of the fractionation tray, as shown in FIGS. 1 and 2.

The actual downcomer means of a Multiple Downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the deck surface and the inlet to the downcomers of the tray below. The top or inlet to the downcomer of a multiple downcomer tray functions as the outlet weir of the tray, and the bottom of the downcomer of a multiple downcomer tray above is therefore well above the outlet weir of the tray located below.

Yet another distinguishing feature of Multiple Downcomer type fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through these openings.

There is no inlet weir at the bottom of the downcomer of Multiple Downcomer type trays as in a crossflow tray. The liquid sealable outlet performs this function and, again, the bottom of the downcomer is well above the next tray.

Multiple Downcomer trays are also characterized by a very short liquid flow path between the point at which the liquid first falls on the tray and the point at which the liquid exits the tray via the downcomer means. This flow path will normally be less than one quarter of the diameter of the tray. This is due primarily to the close spacing of the downcomers as described above.

In FIG. 2 there is shown a portion of a casing (outer vessel) 1 containing three frothing trays 3. Each tray comprises three downcomers 25 which are aligned transverse to the downcomers on the next higher and lower trays. This preferred 90 degree rotation and judicious spacing of the openings in the bottom of the downcomer results in the liquid descending from the spaced-apart openings 9 in the bottom plate 5 falling onto decking 2 of the tray below rather than into the opening of the downcomers of the next tray.

FIG. 2 also provides a better illustration of the preferred rectangular or trough-like structure of the downcomers 25 which is formed from two opposing parallel sidewalls 4 and two shorter parallel end walls 10. The spaced apart openings 9 in the bottom plate 5 allow liquid to flow out of the bottom of the downcomer toward the next lower tray. The great majority of each downcomer is located below the horizontal plane of the tray with a smaller portion located above the tray. The walls of the downcomer extend above the tray and terminate with a straight upper edge 7 which functions as the inlet weir to the downcomer. The packing 17 consists of individual beds which fill the volumes between adjacent downcomers and also extend a short distance below the bottom plate 5 at the bottom of the downcomers. Liquid flows onto the packing through perforations 16 in the downcomer sidewalls and through the openings 9 in the bottom plate 5.

FIG. 3 presents an isometric view of a portion of a Multiple Downcomer tray. The perforations 24 in the tray deck and 16 in the downcomer sidewall are more clearly seen in this enlarged view. As shown it is preferred that all of the perforations in the tray deck are substantially uniform in diameter and area. This Figure also illustrates the provision of an optional "calming deck" 6 formed by an imperforate plate resting on the tray deck 2. A horizontal weir 8 offset by the width of the calming deck is provided as an alternative to the inlet weir otherwise formed by the upward extension of sidewall 4. Packing 17 is only shown under only a portion of the tray to allow illustration of the perforations 16 in the sidewall 4.

In FIG. 2 the perforations 16 are grouped to distribute liquid onto the packing only above deck sections of the lower tray while in FIGS. 1 and 3 they are evenly spaced along the length of the downcomer sidewall.

The subject apparatus can be used in a variety of gas-liquid contacting operations including absorption, gas treating for impurity removal or other processes other than distillation. In each of these processes gas rises upward through the column while liquid trickles downwardly through the packing in a well distributed manner and emerges therefrom as droplets which fall onto frothing trays. The droplets falling onto the frothing trays form a liquid level thereon some of which is frothed by the gas passing upwardly through the column. Some of the liquid on the tray may be allowed to escape through the perforations to form droplets which are well distributed over the packing.

Liquid entering the packing trickles downwardly to exit and fall onto the tray below where the same sequence of operations is repeated.

It will be seen that gas passing upwardly through the column is brought into intimate contact with liquid passing downwardly therethrough because: (i) the usually inactive space above a frothing tray is used as a gas-liquid contacting section by partitioning the column volume above each tray to form an upper, packing-containing section and a lower frothing section; (ii) the packings provide good distribution of the droplets falling gently through the frothing sections onto the frothing trays; and (iii) the frothing trays provide good distribution of the droplets falling through their perforations onto the packings.

The result is that in a gas-liquid transfer operation such as methanol-water distillation, the apparatus according to the present invention can achieve a combined efficiency for the frothing trays and packings of, say, 135% compared with an efficiency of, say, 65% for a low cost, conventional apparatus containing only frothing trays where only a low throughput is possible.

The combination of low cost and high efficiency of an apparatus according to the present invention can result in substantial savings in, for example, the chemical, petroleum and paper industries.

Furthermore, the efficiency and/or throughput of an apparatus according to the present invention has been found to compare favorably with the more expensive apparatus containing only packed beds.

Also, when the gas flow is high, the packings have been found to serve as deentrainment sections thus further improving the gas-liquid contact.

Tests to verify the present invention were carried out in a 6 inch diameter column for the distillation of methanol-water mixtures. A dual-flow tray was used with 318 mm tray packing, 7 mm hole diameter and 20% hole area combined with a 100 mm high structured packing supplied by Glitsch, Inc. of Dallas, Tex. under the trademark Gempack-350. The results indicated (1) a tray efficiency of ~120-140% for an F-factor of 0.8-1.6 $kg^{\frac{1}{2}}s^{-1}m^{-\frac{1}{2}}$ and (2) a maximum operable F-factor=1.8. This compares with an efficiency of 60% and maximum F-factor 1.4 for a sieve or frothing tray with similar tray spacing.

Tests have shown that the packing sections need only be short, say 200 mm, and so wall effects are insignificant.

The frothing trays may be provided with more perforations per unit area adjacent the casing (column sidewall) than at the center area of the trays to provide better distribution of liquid over the packings. It may be noted there is no packing material on the surface of the frothing trays or in the volume immediately above the trays. This allows conventional frothing and liquid flow to occur.

The apparatus according to the present invention can be used in any distillation or absorption process. The packings may be random packings, e.g., rings, spheres or saddles or structured or ordered bed packings, e.g., corrugated, rolled, screens or plates. Examples of random and structured packings are provided in U.S. Pat. Nos. 5,200,119 and 5,132,056.

The apparatus according to the present invention can be in the form of a new apparatus or a modified existing apparatus. That is, an existing trayed column may be modified to employ the subject invention. Any known countercurrent tray arrangement, such as, for example, dual-flow trays, cross-flow sieve trays and Multiple Downcomer trays may be used.

One embodiment of the invention may be characterized as comprising: (a) an upwardly extending cylindrical casing or outer vessel forming a flow path for the flow of liquid downwardly therethrough and the flow of gas upwardly therethrough; (b) a series of frothing trays extending across and partitioning the flow path in the casing at different levels, each tray being perforated sufficiently to allow the downward flow of liquid through the deck portion thereof and for distributing liquid thereacross which has been frothed by gas simultaneously flowing upwardly therethrough; (c) for each pair of frothing trays a perforated packing tray partitioning the portion of the flow path of the casing therebetween to provide a flow path packing section immediately beneath the upper frothing trays, and a flow path frothing section immediately above the lower one of those frothing trays; and, (d) gas-liquid distributing packings in the packing sections.

The frothing trays are fractionation trays as compared to liquid distributors found in packed trays. Some characteristics of fractionation types include: a closer vertical spacing for fractionation trays; a design which causes intimate, vigorous contact of liquid retained on the tray with liquid passing upward through the tray; an abundance of closely spaced perforations across a high percentage of the decking area of the fractionation trays; and a design which leads to the formation of froth on the surface of fractionation trays. Fractionation trays make no attempt to collect and segregate vapor and/or liquid flow before redistributing these phases. By its very nature a liquid distributor would have no use for downcomers which transfer liquid downward any appreciable distance before releasing it to the column.

The Multiple Downcomer tray embodiment of our invention may be thought of as the addition of beds of packing material to the normally open spaces located between adjacent downcomers. These beds may be retained by a single support screen at the level of the bottom of the downcomers or by a number of individual screens extending horizontally between the downcomers. As a further alternative the packing support screen may be located some distance below the bottom of the downcomers with the packing between the downcomers thus being part of a larger overall packing bed which extends upward between the downcomers. In this embodiment the means to supply liquid to the packing bed comprises perforations in the sidewalls. Openings in the decking material may alternatively or in addition be used for this purpose.

Some portion, e.g., 25–70 vol.% of the liquid flowing across the tray deck 2 flows downward through openings 24 to allow liquid to flow onto the packing 17.

Those skilled in the art will recognize there are a number of ways to distribute liquid from the tray to the packing. It is preferred to avoid the use of any mechanically complex system involving conduits, pipes and valves, inclined troughs, etc. Liquid spread across the packing may be derived from a downcomer, a separate liquid collection area or from the tray deck itself. For most purposes it is preferred to utilize some form of "dual flow" tray decking. This type of decking allows liquid to flow downward through the tray decking while vapor simultaneously passes upward, normally by the provision of rather large perforations in the deck material. That is, the tray intentionally allows liquid to "weep" downward. In a conventional dual flow tray, the entire downward liquid flow in the column passes through the tray deck in this manner. This degree of liquid flow through the decking may not be optimum in all situations in which the subject tray is applied and it is therefore contemplated that dual flow decking will be used in conjunction with other means to distribute liquid such as perforations in the sidewalls of conventional downcomers as shown in the Figures. Valving means known to the art may also be placed on the tray to regulate liquid and vapor flow.

In different embodiments of the present invention, fluid permeable, gas distributing means may be provided for each frothing tray. These means are located adjacent the top side of the tray for, in operation, breaking up any bubbles (not shown) forming in the perforations of that frothing tray. The fluid permeable, gas distributing means also assure a more uniform static head of liquid on the frothing trays and a more uniform distribution of liquid across them. This gives a more uniform distribution of liquid gravitating downwardly through the trays. The fluid permeable, gas distributing means may be fibrous or filamentary material in open mat, felt or woven form or an open mesh.

In the embodiment shown in FIG. 2, the bed is suspended by a porous woven wire screen 26. The screen 26 may be itself held in place in a number of ways. The screen may rest on a grid or a plurality of support bars not shown which crisscross the internal volume of the column in a plane parallel to the tray. The screen or the individual packing elements may alternatively be suspended (hung) from the tray above. These mechanical details may be varied to suit individual situations and are not deemed a limitation on the inventive concept.

The upper surface of the packing bed is shown in the Figure as being located adjacent (in contact with) the bottom surface of the tray deck. Contact of packing with deck openings is believed to aid weeping. The top of the packing may alternatively be from 1 to 8 centimeters below the tray, with a gap of 2–3 centimeters being preferred. The packing will also be in contact with at least a portion of the sidewalls of the downcomer and thus fill the normally empty volume located between the two adjacent downcomers. With a dumped packing the upper surface of the bed will be somewhat irregular. The packing material bed may be in the form of preassembled units which are installed under preexisting trays, fabricated in situ under trays or made as an integral part of the overall tray structure. Structured packing may be added to the tray as bundles or subassemblies which together form the packing bed. A dumped packing may be added to the bed through openings in the wall of the outer vessel or through openings in the tray deck above. This unstructured packing may also be preloaded in porous retaining baskets which are then installed under the tray.

The amount of packing used with any one tray is preferably equal in volume to less than 50 percent of the open volume of the column between the upper and lower trays of the pertinent tray pair. The packing bed of the subject invention preferably extends downward to within 8 centimeters of the intended upper surface of the froth on the next lower tray. A minimum bed thickness of 10 cm is desired, with beds up to 30 cm thick being contemplated. Thickness is measured downward from the lower surface of the upper tray. The subject packing bed therefore will not touch the next lower tray or interfere with fluid flow across the tray.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s) and figures. The invention extends to any novel one, or any novel combination, of the features disclosed in this specification (including any accompanying claims, abstract and drawings), or to any novel one, or any novel combination, of the steps of any method or process so disclosed.

What is claimed:

1. A fractionation tray comprising:
   (a) a perforated tray deck having upper and lower surfaces and at least two downcomers, each downcomer comprising two parallel sidewalls and extending through the tray deck, with the tray having means for the upward passage of vapor through the tray deck;
   (b) a bed of packing material at least partially located between the downcomers; and,
   (c) means to distribute liquid over the bed of packing material comprising perforations in a downcomer sidewall.

2. The apparatus of claim 1 wherein said means to distribute liquid over the bed of packing material also comprises perforations in the tray deck.

3. A gas-liquid contacting apparatus comprising a plurality of the trays of claim 1 spaced vertically apart at uniform distances within a cylindrical outer vessel.

4. The apparatus of claim 1 wherein the bed of packing material has an upper surface substantially adjacent the lower surface of said tray deck.

5. A gas-liquid contacting apparatus comprising:
   (a) a fractionation tray comprising a perforated tray deck having upper and lower surfaces and at least one downcomer, said downcomer comprising two parallel sidewalls and extending through the tray deck, with the tray having means for the upward passage of vapor through the tray deck;
   (b) a bed of packing material substantially adjacent the lower surface of said tray deck; and,
   (c) means to distribute liquid over the bed of packing material comprising perforations in a downcomer sidewall.

6. The apparatus of claim 5 wherein said means to distribute liquid over the bed of packing material also comprises perforations in the tray deck.

7. A gas-liquid contacting apparatus comprising a plurality of the apparatus of claim 5 spaced vertically apart at uniform distances within a cylindrical outer vessel.

8. A gas-liquid contacting apparatus comprising:
   (a) a cylindrical vertically aligned outer vessel;
   (b) a plurality of vertically spaced apart multiple downcomer fractionation trays located within said outer vessel with each downcomer comprising two parallel sidewalls which extend through the tray and a liquid sealable outlet located above the deck of the next lower tray;
   (c) a plurality of beds of packing material with each bed of said plurality being
      (i) placed between a pair of said vertically spaced trays;
      (ii) located closer to an upper tray than to a lower of said pair of trays;
      (iii) being equal in volume to less than one-half of the available volume in the outer vessel between the pair of trays; and,
      (iv) at least partially filling the volumes located between the parallel downcomers; and,
   (d) means to distribute liquid collected on said upper tray into said packing material through the sidewalls of said downcomers comprising perforations in a downcomer sidewall.

9. The apparatus of claim 8 wherein said means to distribute liquid over the bed of packing material also comprises perforations in the tray deck.

10. The apparatus of claim 8 wherein the beds of packing material have an upper surface which is substantially adjacent to the lower surface of a tray deck.

11. The apparatus of claim 8 wherein packing material is located between two downcomer sidewalls which each have perforations to distribute liquid onto the packing material.

* * * * *